(12) United States Patent
Gu et al.

(10) Patent No.: US 10,368,376 B2
(45) Date of Patent: *Jul. 30, 2019

(54) SYSTEM AND METHOD FOR HUB-BASED BLUETOOTH AUDIO RELAY

(71) Applicant: CASSIA NETWORKS INC., San Jose, CA (US)

(72) Inventors: Daguang Gu, Beijing (CN); Haitao Shi, Beijing (CN); Fuyong Zhao, San Jose, CA (US)

(73) Assignee: Cassia Network Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/787,796

(22) Filed: Oct. 19, 2017

(65) Prior Publication Data

US 2018/0116003 A1    Apr. 26, 2018

Related U.S. Application Data

(60) Provisional application No. 62/411,376, filed on Oct. 21, 2016.

(51) Int. Cl.
*H04W 4/70*   (2018.01)
*H04W 4/80*   (2018.01)
*H04W 76/11*  (2018.01)
*H04W 76/15*  (2018.01)
*H04W 84/18*  (2009.01)
(Continued)

(52) U.S. Cl.
CPC .............. *H04W 76/11* (2018.02); *H04W 4/70* (2018.02); *H04W 4/80* (2018.02); *H04W 76/15* (2018.02); *H04W 88/04* (2013.01); *H04W 84/18* (2013.01); *H04W 92/18* (2013.01)

(58) Field of Classification Search
CPC ......... H04W 4/80; H04W 76/10; H04W 4/70; H04W 76/15; H04W 92/18; H04W 88/04; H04W 76/11; G06F 3/1285; H04B 7/15507; G10H 2240/321; H04M 1/7253; H04M 2250/02
See application file for complete search history.

(56) References Cited

U.S. PATENT DOCUMENTS

2008/0291863 A1   11/2008   Agren
2012/0115464 A1   5/2012    Jiang et al.
(Continued)

OTHER PUBLICATIONS

Specification of the Bluetooth System, Covered Core Package version 4.0, vol. 0-6; published Jun. 30, 2010; 2302 pages.
(Continued)

*Primary Examiner* — Nizar N Sivji
(74) *Attorney, Agent, or Firm* — Sheppard Mullin Richter & Hampton LLP

(57) ABSTRACT

Various data (e.g., audio) relay devices and methods are disclosed. An exemplary data relay device may comprise a first chip configured to wirelessly connect to one or more physical sink devices, and a second chip. The second chip may be configured to create one or more virtual sink devices configured to be wirelessly detectable by one or more physical source devices, in response to the one or more physical source devices wirelessly connecting to the second chip, obtain data from the one or more physical source devices, and transmit the data to the first chip, causing the first chip to relay the data to the one or more physical sink devices.

16 Claims, 7 Drawing Sheets

(51) Int. Cl.
*H04W 88/04* (2009.01)
*H04W 92/18* (2009.01)

(56) References Cited

U.S. PATENT DOCUMENTS

2013/0042291 A1 2/2013 Kambhatla
2016/0227354 A1 8/2016 Zhao et al.

OTHER PUBLICATIONS

Specification of the Bluetooth System, Covered Core Package version 4.1, vol. 0-7; published Dec. 3, 2013; 2684 pages.
Specification of the Bluetooth System, Covered Core Package version 4.2, vol. 0-7; published Dec. 2, 2014; 2772 pages.
Bluetooth Advanced Audio Distribution Profile Specification, Ver. 13, Jul. 24, 2012; 77 pages.
Bluetooth Audio/Video Distribution Transport Protocol Specification, Ver. 13, Jul. 24, 2012; 140 pages.
Bluetooth Generic Audio/Video Distribution Profile Specification, Ver. 13, Jul. 24, 2012; 38 pages.
International Search Report and Written Opinion for Application No. PCT/US2017/057286, dated Jan. 4, 2018, 10 pages.

SYSTEM AND METHOD FOR HUB-BASED BLUETOOTH AUDIO RELAY

CROSS-REFERENCE TO RELATED APPLICATION

The present application is based on and claims priority to the Provisional Application No. 62/411,376, filed Oct. 21, 2016, entitled "SYSTEM AND METHOD FOR HUB-BASED BLUETOOTH AUDIO RELAY." The entire contents of all of the above-referenced application are incorporated herein by reference.

TECHNICAL FIELD

The present disclosure relates generally to Bluetooth technologies, and more particularly, to methods and systems for hub-based data relay.

BACKGROUND

Bluetooth technologies support wireless data exchange over short distances (less than ten meters indoor). Basic Rate/Enhanced Data Rate (BR/EDR) technology is one type of the Bluetooth technologies serving many applications, and may include various application standards such as Advanced Audio Distribution profile (A2DP), Audio/Video Remote Control Profile (AVRCP), and Hands-Free Profile (HFP). Among them, A2DP is mainly applied in Bluetooth speakers, headphones, and other audio applications.

Current technologies are inadequate to provide the demand for Bluetooth technologies. In some applications, multiple Bluetooth speakers may need to be connected to an audio source simultaneously to play audio data. In some other applications, multiple audio sources may need to connect to one or more Bluetooth speakers to play the audio data. Nevertheless, most existing devices only allow one-to-one one connection. That is, a cellphone or computer can only connect to one Bluetooth speaker.

SUMMARY

Various embodiments of the present disclosure can include systems, methods, and non-transitory computer readable media configured to relay data. According to one aspect, a data relay device may comprise a first chip and a second chip. The first chip may be configured to wirelessly connect to one or more physical sink devices. The second chip may be configured to: create one or more virtual sink devices configured to be wirelessly detectable by one or more physical source devices, in response to the one or more physical source devices wirelessly connecting to the second chip, obtain data from the one or more physical source devices, and transmit the data to the first chip, causing the first chip to relay the data to the one or more physical sink devices.

In some embodiments, the physical source device comprises an audio data providing device; the physical sink device comprises an audio playing device; and the data transmitted among the one or more physical sources devices, the data relay device, and the one or more physical sink devices comprises audio data.

In some embodiments, the wireless connection between the first chip and the one or more physical sink devices comprises one or more Bluetooth connections; and the wireless connection between the second chip and the one or more physical sources devices comprises one or more Bluetooth connections.

In some embodiments, the data relay device further comprises a memory storing one or more profiles. To wirelessly connect to the one or more physical sink devices, the first chip is configured to register the one or more physical sink devices in the profile. The created the one or more virtual sink devices correspond to the registered one or more physical sink devices.

In some embodiments, the one or more physical sink devices comprise multiple physical sink devices. To wirelessly connect to one or more physical sink devices, the first chip is configured to register a stream endpoint for each of the multiple physical sink devices in the profile. To create the one or more virtual sink devices configured to be wirelessly detectable by the one or more physical source devices, the second chip is configured to create one or more virtual sink endpoints each connectable to one of the physical source devices. To transmit the data to the first chip, the second chip is configured to: determine a pairing between each of the physical source devices and one or more of the physical sink devices, and transmit the data based on the determined pairing.

In some embodiments, the physical source devices comprise a first physical source device paired with a plurality of first physical sink devices of the physical sink devices. To obtain the data from the first physical source device, the second chip is configured to stream first data from the first physical source device to a first of the virtual sink end points via a Bluetooth connection. To relay the data to the first physical sink devices, the first chip is configured to stream the first data to the first physical sink devices each via a Bluetooth connection.

In some embodiments, the physical source devices further comprises a second physical source device paired with one or more second physical sink devices of the physical sink devices. To obtain data from the second physical source device, the second chip is configured to stream second data from the second physical source device to a second of the virtual sink end points via an Bluetooth connection. To relay the data to the second physical sink devices, the first chip is configured to stream the second data to the second physical sink devices each via an Bluetooth connection. The first and second data is played simultaneously and respectively at the first and second physical sink devices.

In some embodiments, the profile is an Advanced Audio Distribution Profile (A2DP). The Bluetooth connection between the first chip and the one or more physical sink devices and the Bluetooth connection between the second chip and the one or more physical source devices each comprise an Advanced Audio Distribution Profile (A2DP) connection.

In some embodiments, the profile is a Hands-Free Profile (HFP) for bi-directional data transfer. The Bluetooth connection between the first chip and the one or more physical sink devices and the Bluetooth connection between the second chip and the one or more physical source devices each comprise a Synchronous (SCO) Stream connection.

In some embodiments, the Bluetooth connection between the first chip and the one or more physical sink devices and the Bluetooth connection between the second chip and the one or more physical source devices each further comprise a Service Level connection (SLC); and the first chip and the second chip are connected directly by a SLC.

According to another aspect, a data relay method, implementable by a data relay device comprising a first chip and a second chip, may comprise: wirelessly connecting, by the first chip, to one or more physical sink devices; creating, by the second chip, one or more virtual sink devices configured to be wirelessly detectable by one or more physical source devices; in response to the one or more physical source devices wirelessly connecting to the second chip, obtaining, by the second chip, data from the one or more physical source devices; and transmitting, by the second chip, the data to the first chip, causing the first chip to relay the data to the one or more physical sink devices.

According to another aspect, a data relay device may comprise a processor and a non-transitory computer-readable storage medium coupled to each other. The processor may comprise a first chip and a second chip. The non-transitory computer-readable storage medium may store instructions that, when executed by the processor, cause the processor to perform a method comprising: wirelessly connecting, by the first chip, to one or more physical sink devices; creating, by the second chip, one or more virtual sink devices configured to be wirelessly detectable by one or more physical source devices; in response to the one or more physical source devices wirelessly connecting to the second chip, obtaining, by the second chip, data from the one or more physical source devices; and transmitting, by the second chip, the data to the first chip, causing the first chip to relay the data to the one or more physical sink devices.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

The accompanying drawings, which constitute a part of this disclosure, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

Systems and methods for hub-based audio relay are disclosed, which can at least mitigate the problems set forth above in existing technologies. In some embodiments with reference to an A2DP scheme, multiple Bluetooth speakers may connect simultaneously to an audio source through a Hub to play audio data. In the implementation, the Hub may function as a virtual Audio Source (e.g., a virtual source device for providing audio data), while the speakers act as an Audio SINK (e.g., an end device associated with the audio data such as an earphone). The Hub may obtain audio data from a physical Audio Source (e.g., a physical source device for providing audio data) such as microphone, mobile device, computer, or internet and distribute audio data to the each Audio SINK.

In some embodiments, the Hub may transmit the audio data through WIFI or Bluetooth. For the internet transmission, the Hub may retrieve the audio data from the Cloud internet as the Audio Source. For playing audio data stored on a PC, the audio data may be transmitted through WIFI, Ethernet, or Bluetooth. The PC, mobile phone, or similar devices may have been installed with a special plug-in or Application for connecting to the Hub. Through the connection, one or more PCs and mobile phones can have access to an unlimited number of Audio SINKs (e.g., speakers or other Bluetooth devices) linked to the Hub, thus overcoming the disadvantages of existing technologies. In another word, the Hub may function as a virtual Bluetooth speaker to receive the audio data from Audio Sources and then distribute the received audio data to Audio SINKs such as physical speakers. This method mode may be referred to as BlueStream. Under the BlueStream, the Hub may simulate one or more Audio SINKs (e.g., Bluetooth speaker) and set them to be discoverable, detectable, and can be automatically connected without user operation. The pairing condition for the simulated Bluetooth speaker may be Just Works™. Thus, the PC or another device may connect to the Hub automatically and transmit information such as the audio data through the Hub.

Figure 1A:
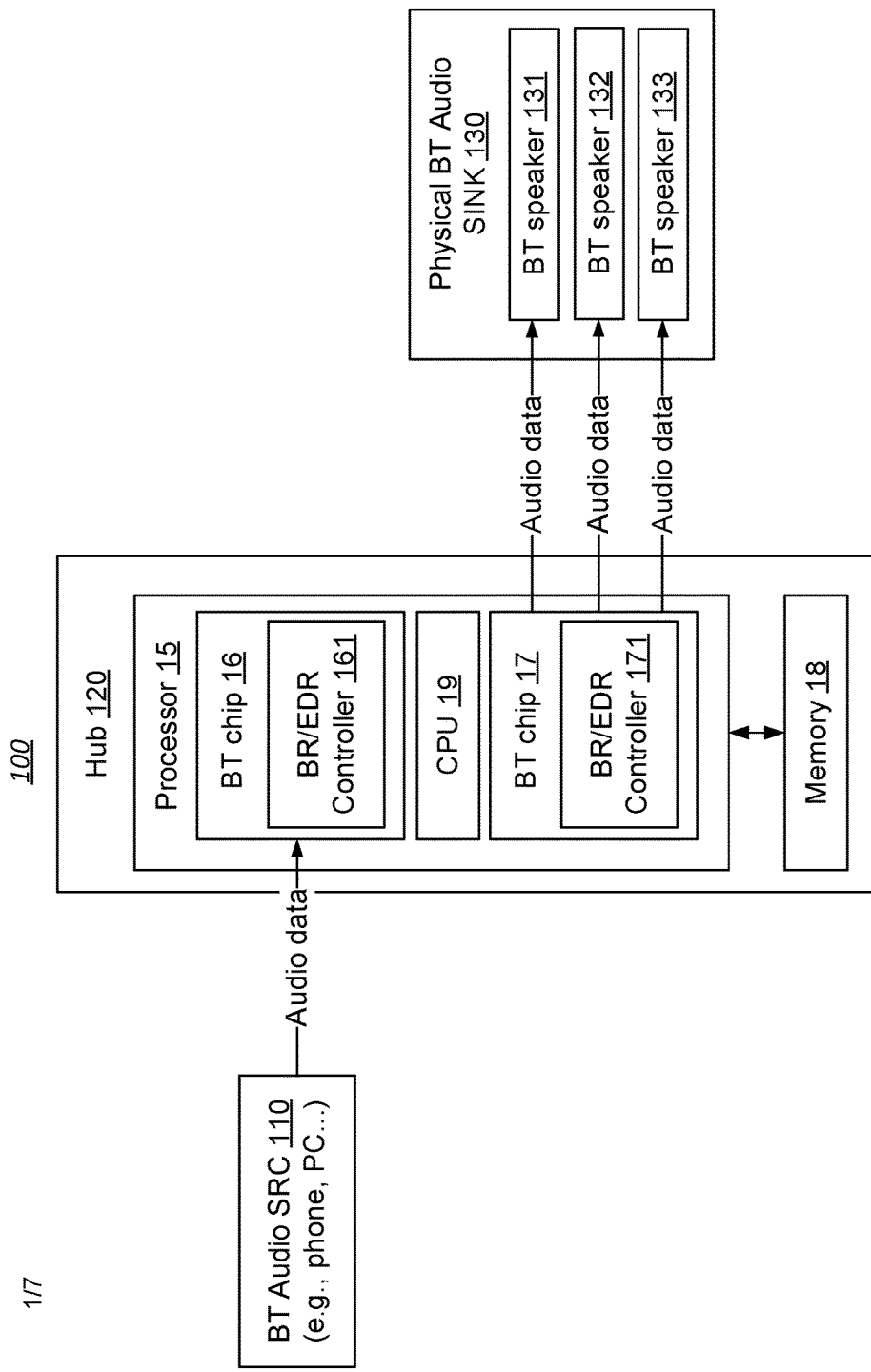
FIG. 1A is a block diagram illustrating a hub-based data relay system, consistent with exemplary embodiments of the present disclosure.

FIG. 1A is a block diagram illustrating a hub-based data relay system 100, consistent with exemplary embodiments of the present disclosure. The relayed data may include audio, and the data relay may be based on Bluetooth connections among various devices. The system 100 may include a Bluetooth Audio Source (BT Audio SRC) device 110, a Hub 120, and physical BT Audio SINK (Audio Sink) devices 130, all of which connected via Bluetooth. Audio data may be relayed from the BT Audio SRC device 110 to the physical BT Audio SINK devices 130 through and by the Hub 120. The BT Audio SRC device 110 may have various embodiments, such as laptops, desktops, pads, cellphones, wearable devices, and the like. The Hub 120 is a physical device. The physical BT Audio SINK devices 130 may include one or more Bluetooth devices, e.g., BT speakers 131-133. Some of the components shown in FIG. 1A, such as one or more of the speakers, may be optional. The system 100 may also include more devices not shown in FIG. 1A, such as multiple Audio Source devices similarly connected to the Hub 120 as the BT Audio SRC device 110.

The Hub 120 may include a processor 15 and a memory 18 coupled together. The processor 15 may include a BT chip 16 configured to communicate with the BT Audio SRC device 110, a BT chip 17 configured to communicate with BT speakers 131-133 of the physical BT Audio SINK devices 130, and a CPU 19 coupled together. Alternatively, the BT chip 16 and/or the BT chip 17 may be implemented on the CPU 19. Audio data may be transmitted through such communication connections to be relayed from one device to another. The BT chip 16 may comprise a BR/EDR controller 161, and the BT chip 17 may comprise a BR/EDR controller 171. The CPU 19 may be configured to execute instructions associated with operations of the Hub 120, such as using the BT chips 16 and 17 to relay data and provide wireless communication. The memory 18 may be non-transitory and computer-readable and store instructions that, when executed by one or more components of the processor 15, cause the processor 15 to execute one or more methods disclosed herein.

In some embodiments, the hub 120 may be used to increase the communication range between a Bluetooth-enabled client device and a Bluetooth device. For example, the hub 120 may be implemented with smart antennas and/or smart front end systems to extend the Bluetooth communication range. Some exemplary methods and systems for implementing the hub 120 are described in U.S. Provisional Application No. 62/110,250, filed Jan. 30, 2015, entitled "METHODS, DEVICES AND SYSTEMS FOR INCREASING WIRELESS COMMUNICATION RANGE," U.S. Provisional Application No. 62/110,262, filed Jan. 30, 2015, entitled "BLUETOOTH TRANSPARENT RELAY," and U.S. patent application Ser. No. 14/919,124, filed Oct. 21, 2015, entitled "METHODS, DEVICES AND SYSTEMS FOR BLUETOOTH AUDIO TRANSMISSION," the entire contents of all of which are incorporated herein by reference.

In some embodiments, the BT chips 16 and 17 may each include a Bluetooth transceiver and be configured to communicate with Bluetooth devices, such as BT Audio SRC device 110 and BT speakers 131-133. In some embodiments, each of the BT chips 16 and 17 may include one or more audio connections that can be used to input/output audio data. Each of the audio connections may be configured to input/output the same or different audio data at a given time instant. Thus, the Hub 120 may accept sound input from one or more sources and redirecting it to one or more appropriate Bluetooth devices.

Figure 1B:
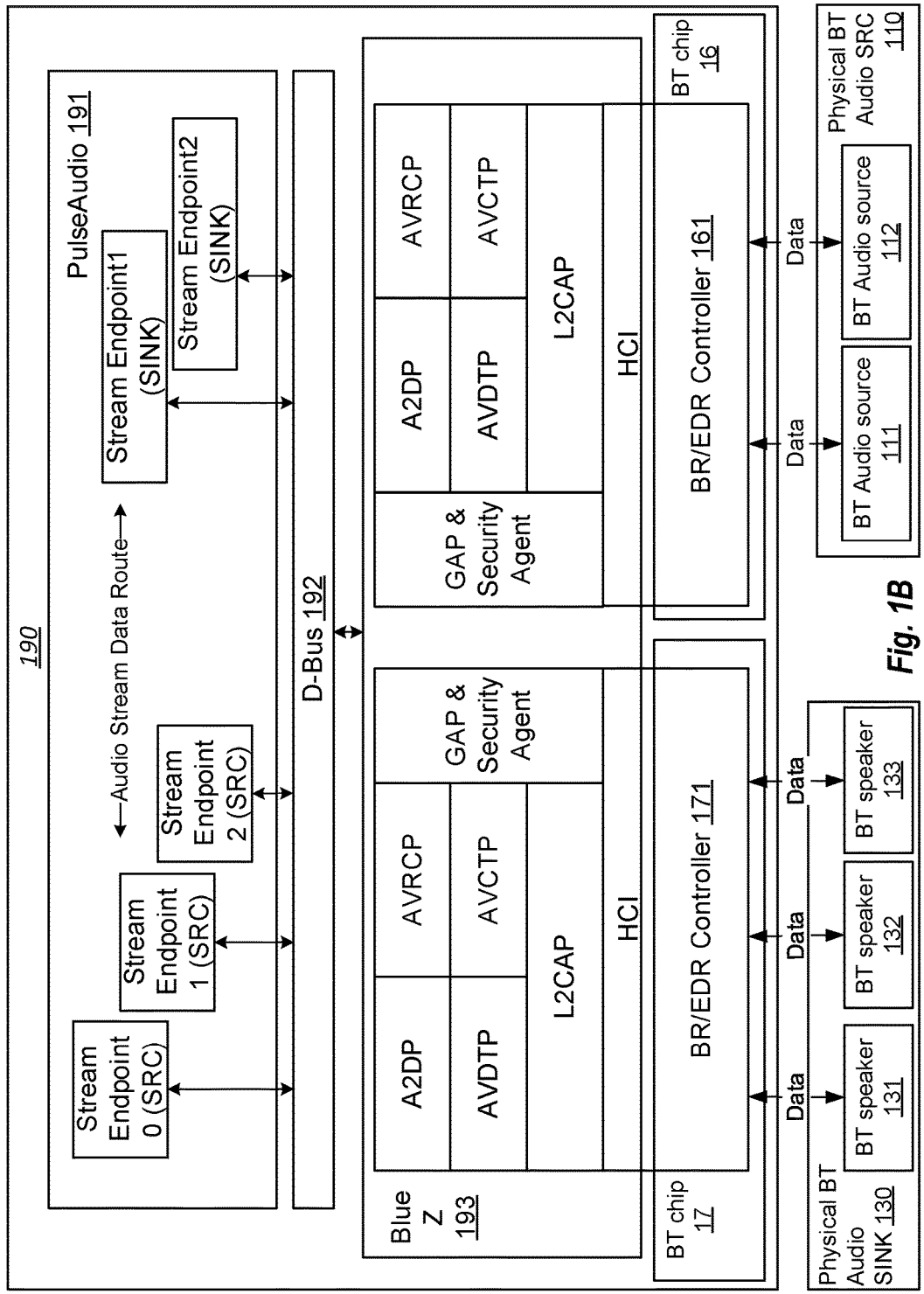
FIG. 1B is a block diagram illustrating a hub-based data relay system, consistent with exemplary embodiments of the present disclosure.

FIG. 1B is a block diagram illustrating a hub-based data relay system 190, consistent with exemplary embodiments of the present disclosure. The relayed data may include audio, and the data relay may be based on Bluetooth connections among various devices. The system 190 as shown may comprise a mix of software (e.g., PluseAudio 191, D-Bus 192, BlueZ 193) and hardware (e.g., BT chip 16, BT chip 17). Some or all of the components of the system 190 may be implemented on the Hub 120. For example, the software may be implemented as the instructions stored in the memory 18. For another example, the BT chip 16 or 17 can be implemented on the processor. The system 190 may be coupled to various devices to transmit data. For example, the BT chip 16 may couple to one or more Audio SRCs (e.g., BT audio source 111 and BT audio source 112, both of which are similar to BT audio source 110 described above), the BT chip 17 may couple to one or more Audio SINK devices 130 (e.g., BT speaker 131, BT speaker 132, BT speaker 133). The system 190 may relay data (e.g., music data) from the one or more Audio SRCs to the one or more Audio SINKs as described below.

The system 190 may include a PulseAudio program 191 communicating with a BlueZ stack 193 via a D-Bus (data bus) process 192. Some or all of the PulseAudio program 191, the BlueZ stack 193, and the D-Bus process 192 may be implemented as software programs. The BlueZ stack 193 may also interact with the BR/EDR controllers 171 and 161 respectively in the physical BT chip 17 and BT chip 16. In some embodiments, the BT chip 16 functioning as a virtual Audio SINK is configured to establish A2DP connection with the physical BT Audio SRC 110 (e.g., BT audio source 111, BT audio source 112), and the BT chip 17 functioning as a virtual Audio SRC is configured to establish A2DP connections with the physical BT Audio SINK devices 130 (e.g., BT speaker 131, BT speaker 132, BT speaker 133). Thus, the BT chip 16 can obtain audio data from the BT Audio SRC 110, relay the audio data to the BT chip 17, and distribute the audio data to the BT Audio SINK devices 130.

In some embodiments, the BlueZ stack 193 may comprise two sets of Bluetooth host protocol stacks. The two sets of protocol stacks may comprise the same or different protocols. One set may correspond to and be associated with the BT chip 16, and the other set may correspond to and be associated with the BT chip 17. Each set of protocol stacks may implement various standards such as HCI (Host Controller Interface), L2CAP (Logical Link Control and Adaptation Protocol), AVDTP (Audio/Video Distribution Transport Protocol), AVCTP (Audio/Video Control Transport Protocol), A2DP, AVRCP, GAP (Generic Access Profile), etc. The standards will allow connection between a SRC device and a SINK device. That is, the BlueZ stack 193 may include software programs configured to facilitate multimedia audio streaming from the Hub 120 to a Bluetooth device and/or from a Bluetooth device to the Hub 120. For example, the BlueZ stack 193 may include an A2DP that allows Bluetooth audio streaming from a Bluetooth-enabled client device to a Bluetooth speaker or headset via the Hub 120. As another example, the BlueZ stack 193 may include an AVDTP that specifies the transport protocol for audio and video distribution and streaming over the Bluetooth air interface. As another example, the BlueZ stack 193 may include an AVRCP protocol that allows a user to control media playback from Bluetooth audio devices, such as Bluetooth speakers or headsets. Also shown in FIG. 1B, the BlueZ stack 193 may include a GAP and a security agent. The GAP may be responsible for Bluetooth detection, connection establishment, and disconnection, and the security agent may be responsible for various pairing methods, such as through pincode, passkey, out of band (OOB), etc. For user convenience, the default pairing method for the disclosed system may be Just Works™.

The BlueZ stack 193 may implement the scan, pair, and connect functions to establish a Bluetooth connection. The BlueZ stack 193 may interact with the D-Bus 192 and/or the Bluetooth chips 17 and 16, and provide data output to the PluseAudio 191. Other alternative Bluetooth stacks may also implement functionalities provided in the Bluetooth protocol.

The PulseAudio 191 may comprise a background process accepting audio input from one or more sources (e.g., processes, capture devices) and redirecting it to one or more sinks (e.g., sound cards, remote network PulseAudio servers). The PulseAudio 191 may function as the audio manager 122 (described below) to route the audio data to an appropriate Bluetooth audio device. The PulseAudio 191 may also be used for interacting with and managing end-user applications. The PulseAudio 191 may be replaced by an alternative application layer to implement one or more methods or functions described herein. In some implementations, the PulseAudio 191 may include a media player used to decode audio and/or video files, such as open source media player MPlayer, Windows media Player™, or the like.

To connect with multiple BT speakers, the PulseAudio 191 may register multiple (three in this case) stream endpoints A2DP SRC in BlueZ 193 via D-Bus 192, with each stream endpoint corresponding to an independent audio stream and to an underlying Bluetooth connection. For example, stream endpoint0 (SRC) corresponds to the Bluetooth connection between the BT chip 17 and the BT speaker 131, stream endpoint1 (SRC) corresponds to the Bluetooth connection between the BT chip 17 and the BT speaker 132, and stream endpoint2 (SRC) corresponds to the Bluetooth connection between the BT chip 17 and the BT speaker 133.

In some embodiments, the PulseAudio 191 registers one or more stream endpoints (e.g., stream endpoint1 (SINK), stream endpoint2 (SINK)) in the BlueZ 193 and the BT chip 16, to simulate BT chip 16 as a virtual Bluetooth device that functions as an A2DP SINK. Since every Bluetooth A2DP music application is a music data flow from one stream endpoint to another stream endpoint, the registration of the stream endpoints for the BT Audio SINKs in the BlueZ 193 and the BT chip 16 can turn BT chip 16 into a virtual BT speaker for connection to a physical audio source. Also, service attributes of the stream endpoints may be registered in a service discovery protocol (SDP) database (a standard protocol defined in Bluetooth Core Specification). SDP records in database can be discovered by remote Bluetooth devices, and can provide the remote Bluetooth devices with general function information. Thus, when the a Bluetooth scan is activated on the physical BT Audio SRC 110, the virtual Bluetooth device (the BT chip 16) with Audio SINK services can be discovered with function information and be connected accordingly.

In some embodiments, via the BT chip 16, the stream endpoint1 (SINK) may correspond to and stream from the BT audio source 111, and the stream endpoint2 (SINK) may correspond to and stream from the BT audio source 112. The PulseAudio 191 may determine that data from the BT audio source 111 (111 data) is to be played on BT speaker 131, and data from the BT audio source 112 (112 data) is to be played on BT speaker 132 and 133. The determination may be based on instructions received from the BT audio source 111 and the BT audio source 112. Accordingly, the PulseAudio 191 may relay the 111 data to the stream endpoint0 (SRC) and relay the 112 data to the stream endpoint1 (SRC) and the stream endpoint2 (SRC).

Figure 2:
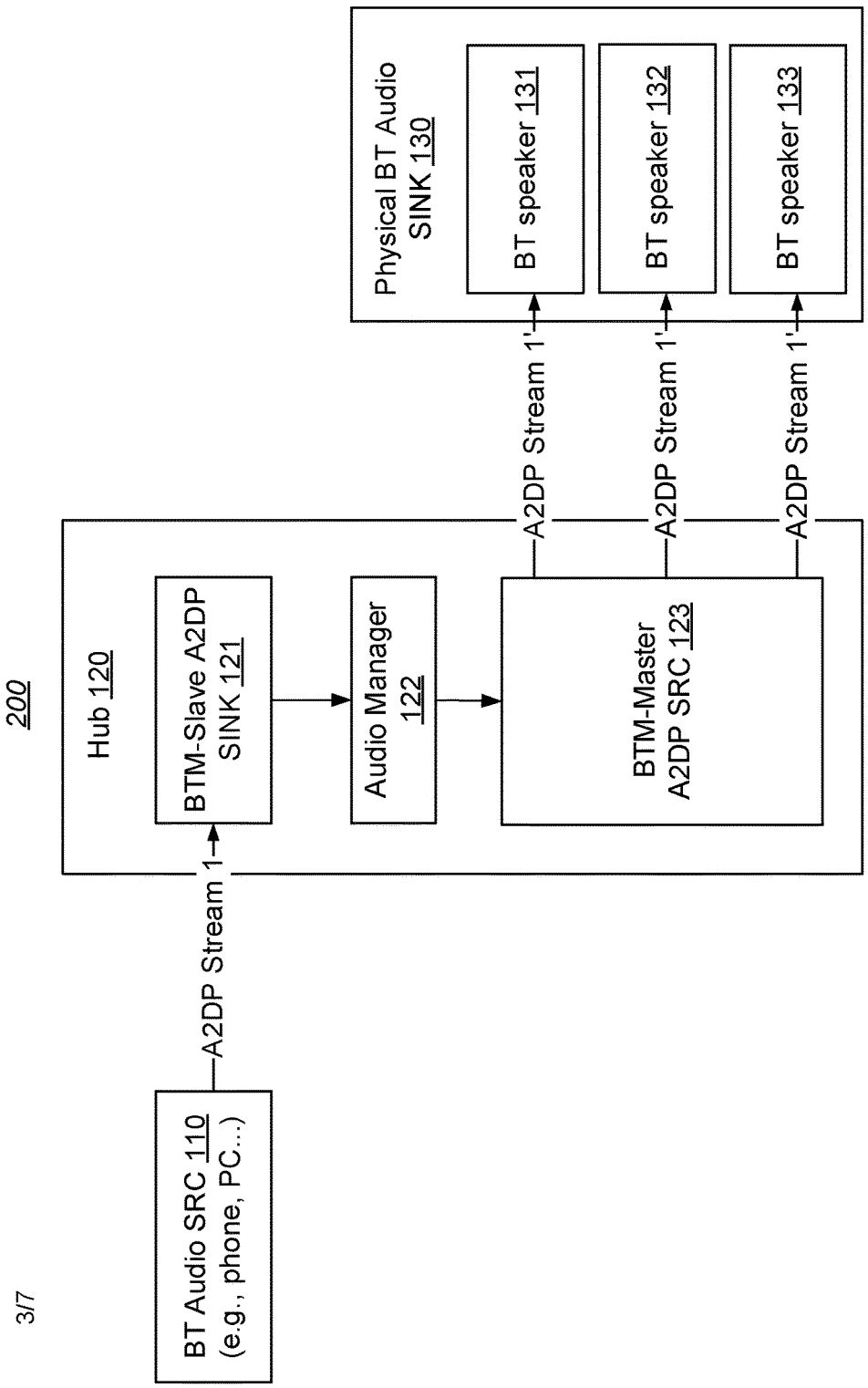
FIG. 2 is a block diagram illustrating a hub-based data relay system, consistent with exemplary embodiments of the present disclosure.

FIG. 2 is a block diagram illustrating a hub-based data relay system 200, consistent with exemplary embodiments of the present disclosure. The relayed data may include audio, and the data relay may be based on Bluetooth connections among various devices. The system 200 may describe relaying audio data from an audio source to one or more audio players.

The system 200 may include a Bluetooth Audio Source (BT Audio SRC) 110, a Hub 120, and physical BT Audio SINK devices 130, all of which connected via Bluetooth. As described above, the BT Audio SRC 110 may have various embodiments, such as laptops, desktops, pads, cellphones, wearable devices, and the like. The Hub 120 is a physical device. The physical BT Audio SINK devices 130 may include one or more Bluetooth devices (e.g., BT speakers 131-133). Some of the components shown in FIG. 2, such as one or more of the speakers, may be optional.

In the example shown in FIG. 2, various devices can be connected through A2DP profiles. The Hub 120 may include an audio manager 122 and two A2DP application units: a BTM (Bluetooth module)-Slave A2DP SINK 121 and a BTM-Master A2DP SRC 123. The BTM (Bluetooth module)-Slave A2DP SINK 121 and the BTM-Master A2DP SRC 123 may be respectively implemented on the BT chip 16 and the BT chip 17 described above. The BTM (Bluetooth module)-Slave A2DP SINK 121 may be a software module to control chip 16 BTM-Slave, the BTM-Master A2DP SRC 123 may be a software module to control chip 17 BTM-Master, and the audio manager 122 may be a software module to manage audio data stream. In some embodiments, the BTM-Slave A2DP SINK 121 may comprise a virtual slave end (e.g., the stream endpoint (SINK) described above) of Bluetooth communications. In an exemplary implementation, the BT Audio SRC 110 may scan for BT devices and discover the virtual slave end of the Hub 120. When discovered, the BTM-Slave A2DP SINK 121 may be shown as the BlueStream, to which the BT Audio SRC 110 may connect and transmit audio data through A2DP stream 1. The BTM-Slave A2DP SINK 121 may transmit the received audio data to the audio manager 122, which may then transmit the audio data to the BTM-Master A2DP SRC 123. The BTM-Master A2DP SRC 123 may relay the audio data to various physical BT Audio SINK devices (e.g., BT speakers 131-133) via respective A2DP streams 1'. For example, the Hub 120 may communicate with the BT speakers via the link layer level BlueZ 193. When communicating with the Bluetooth devices, the Hub 120 may operate as a master device that initiates an outgoing connection request to one of the Bluetooth devices that serve as slave devices. Thus, in some embodiments, the virtual BTM-Slave A2DP SINK 121 is generated when the Hub 120 acts as an slave end (e.g., the stream endpoint (SINK) described above), and the BTM-Master A2DP SRC 123 is used when the Hub 120 acts as an transmitting end (e.g., the stream endpoint (SRC) described above). Through the Hub 120, audio data from the A2DP stream 1 connection is relayed to respective A2DP stream 1' connections to reach the various receiving devices.

Figure 3:
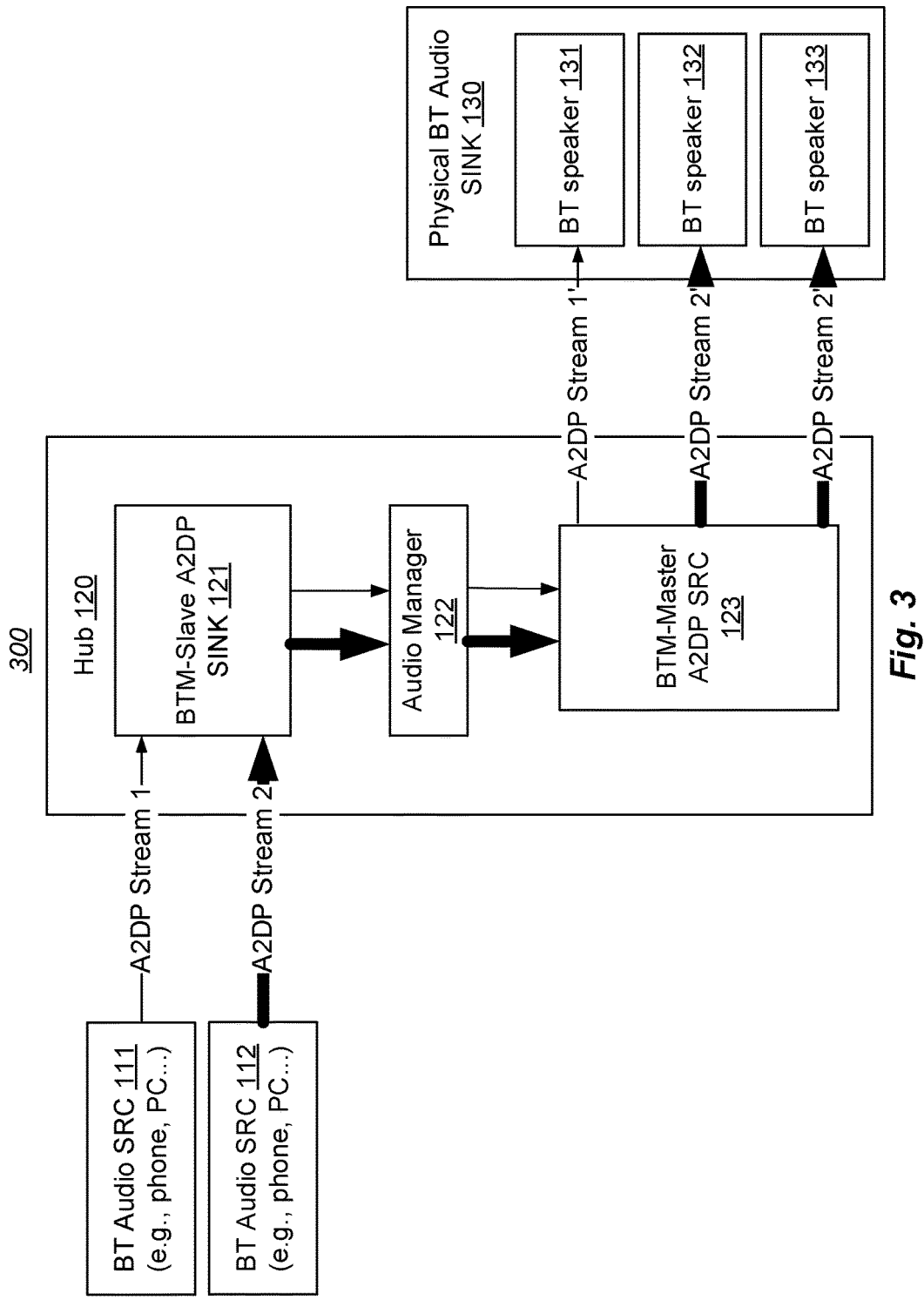
FIG. 3 is a block diagram illustrating a hub-based data relay system, consistent with exemplary embodiments of the present disclosure.

FIG. 3 is a block diagram illustrating a hub-based data relay system 300, consistent with exemplary embodiments of the present disclosure. The relayed data may include audio, and the data relay may be based on Bluetooth connections among various devices. The system 300 may describe relaying audio data from each of multiple audio sources to one or more audio players through a hub.

The system 300 may include BT Audio SRC devices 111 and 112, a Hub 120, and physical BT Audio SINK devices 130, all of which connected via Bluetooth. The BT Audio SRC devices 111 and 112 may be similar to the BT Audio SRC device 110 described above. The Hub 120 and its components virtual BTM slave A2DP SINK 121, Audio Manager 122, and BTM-Master A2DP SRC 123 may be similar to those described above with reference to FIG. 2. The physical BT Audio SINK devices 130 and its components BT speakers 131-133 may be similar to those described above with reference to FIG. 2. Some of the components shown in FIG. 3 may be optional.

In the example shown in FIG. 3, various devices are connected through A2DP profiles. The BT Audio SRC device 111 may target to transmit audio data to the BT speaker 131, whereas the BT Audio SRC device 112 may target to transmit audio data to the BT speakers 132 and 133. That is, a user may want to simultaneously play music stored on a first device from a first set of speakers and play music stored on a second device from a second set of speakers (e.g., when the two sets of speakers are disposed in different locations). Thus, two streams of audio data, respectively represented by regular arrows "A2DP stream 1 and A2DP stream 1'" and thickened arrows "A2DP stream 2 and 2'" in FIG. 3, are correspondingly relayed from the sources to the Sink targets.

In some embodiments, the A2DP stream 1 relaying audio data from the BT Audio SRC 111 to the BT speaker 131 may be established similarly to that described above with reference to FIG. 2. After the BT speaker 131 receives the audio data from the BT Audio SRC device 111, the BTM-slave A2DP SINK 121 may be configured to be discoverable again. If detected, for example, by the BT Audio SRC device 112, the BTM-slave A2DP SINK 121 may still be shown as the BlueStream, to which the BT Audio SRC 112 may connect and transmit audio data through A2DP stream 2. The BTM-Slave A2DP SINK 121 may transmit the received audio data to the audio manager 122, which may then transmit the audio data to the BTM-Master A2DP SRC 123. The BTM-Master A2DP SRC 123 may relay the audio data to various physical BT Audio SINK devices (e.g., BT speakers 132 and 133) via respective A2DP stream 2'. Thus, through the hub 120 and its virtual BTM-Slave A2DP SINK, each of multiple audio sources can connect to one or more speakers simultaneously. That is, audio data from different audio input devices can be relayed to respective audio player devices correspondingly through the A2DP stream 1 and A2DP stream 2 connections. Users can enjoy the freedom of configuring the audio data path from any source to sink. More devices and stream connections may be additionally established as described.

Figure 4:
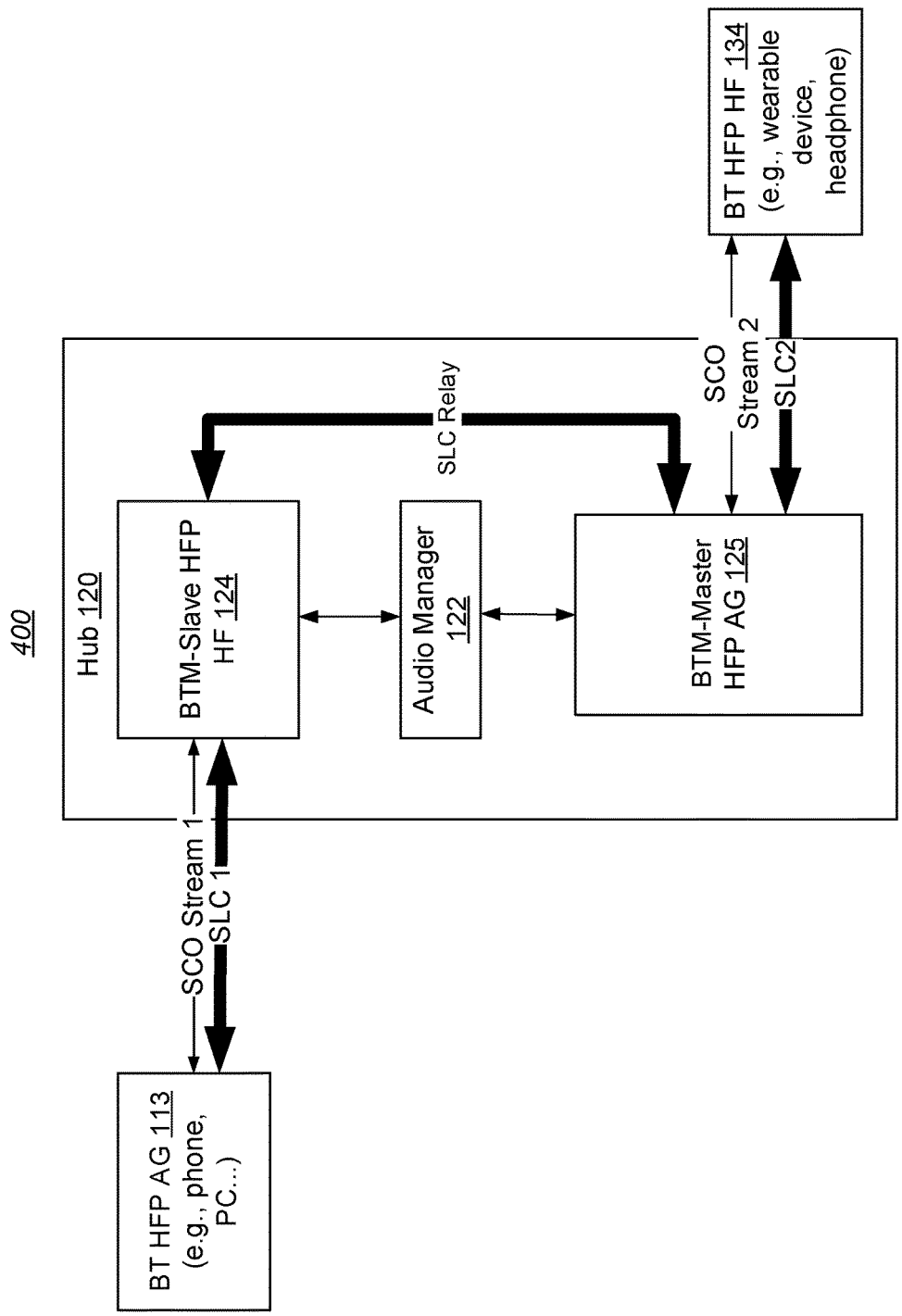
FIG. 4 is a block diagram illustrating a hub-based data relay system, consistent with exemplary embodiments of the present disclosure.

FIG. 4 is a block diagram illustrating a hub-based data relay system 400, consistent with exemplary embodiments of the present disclosure. The relayed data may include audio, and the data relay may be based on Bluetooth connections among various devices. The system 400 may describe relaying audio data to a hand-free device through a hub, allowing applications such as hand-free phone conversations. The use of Hub 120 also extends the effective working range of the hand-free device.

The system 400 may include a Bluetooth Hand-free Profile Audio Gateway (BT HFP AG) device 113, a Hub 120, and a Bluetooth Hand-free Profile Hand-free (BT HFP HF) device 134, all of which connected via Bluetooth. The BT HFP AG device 113 may have various embodiments, such as laptops, desktops, pads, cellphones, telephones, and the like. The Hub 120 is a physical device. The Hub 120 may comprise a BTM-Slave HFP HF unit 124, an audio manager 122, and a BTM-Master HFP AG unit 125, all of which may be software modules. The BTM-Slave HFP HF unit 124 may be similar to the virtual BTM-Slave A2DP SINK 121 discussed above, and the BTM-Master HFP AG unit 125 may be similar to the BTM-Master A2DP SRC 123 discussed above. The BT HFP HF device 134 may be, for example, a wearable device, a Bluetooth headphone, etc. In some embodiments, a difference between A2DP and HFP connections is that the audio data stream in HFP may be bi-directional (e.g., phone conversation), whereas A2DP may be uni-directional (e.g., listening to music). Some of the components shown in FIG. 4 may be optional.

In some embodiments, to establish the connection between the BT HFP AG device 113 and the BT HFP HF device 134, the BT HFP HF device 134 can be configured in a discoverable mode, waiting for a connection request from a BT HFP AG device. This connection may be referred to as a HFP connection, which may include two main steps: Service Level Connection (SLC) establishment and synchronous (SCO) stream connection. The BT HFP AG device 113 and the BT HFP HF device 134 establish the SLC connection represented by thickened arrows SLC1, SLC2, and SLC Relay in FIG. 4. SLC is an AT command interaction process defined in HFP profile, and The SLC is used for transmission and reception of AT commands. The AT command comprises a set of commands defined based on Global Systems for Mobile Communications (GSM), including some extension by Bluetooth HFP. The SLC connection may provide the BT HFP HF device 134 with information of the remote BT HFP AG device 113 and/or any phone call. If the SLC connection is established, the BTM-Slave HFP HF unit 124 can control the remote BT HFP AG device 113, for example, control a cell phone to make calls, find contact number, etc. Further, when the BT HFP AG device 113 device receives an incoming or outgoing call, it may request to a SCO connection (e.g., an audio data connection in HFP) for real-time audio streaming. SCO connection can transfer audio data between HF and AG. When the SCO connections represented by SCO stream 1 and SCO stream 2 are established, a user may conduct hand-free phone conversations through the BT HFP HF 134. If the BT HFP HF 134 receive a AT command indicating an incoming call, the BT HFP HF 134 may send an AT command to the BT HFP AG device 113 through the SLC connection to accept or reject the call. If call accepted, an audio data stream is needed to transmit voices, and the BT HFP AG device 113 may establish the SCO connection to the BT HFP HF 134 for such audio data transfer.

In general, the effective communication range between a Bluetooth earphone (an exemplary BT HFP HF 134) and a cellphone (an exemplary BT HFP AG device 113) is about 10 meters. With the Hub 120's relay and high sensitivity, the overall connection range between the earphone and the cell phone can be at least doubled. Thus, the overall effective communication range can be extended by using the Hub 120, instead of directly connecting the BT HFP AG device 113 and the BT HFP HF device 134 via Bluetooth.

Figure 5:
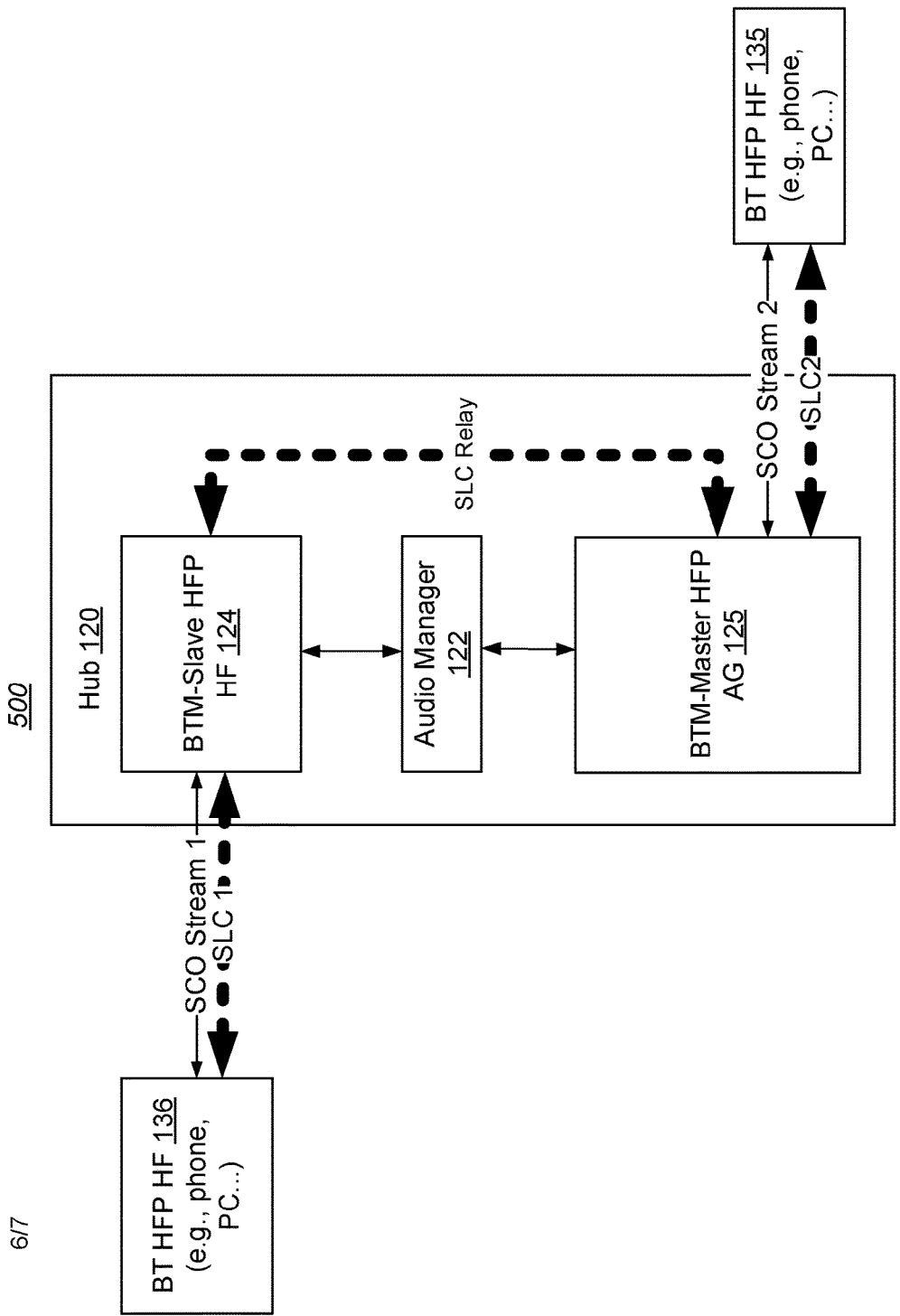
FIG. 5 is a block diagram illustrating a hub-based data relay system, consistent with exemplary embodiments of the present disclosure.

FIG. 5 is a block diagram illustrating a hub-based data relay system 500, consistent with exemplary embodiments of the present disclosure. The relayed data may include audio, and the data relay may be based on Bluetooth connections among various devices. The system 500 may describe relaying audio data among multiple hand-free devices through a hub.

The system 500 may include BT HFP HF devices 136 and 135 and a Hub 120, all of which connected via Bluetooth. The BT HFP HF devices 136 and 135 may be similar devices. The Hub 120 is a physical device. Some of the components shown in FIG. 4 may be optional.

In some embodiments, to establish the connection among multiple hand-free devices through a hub, the BT HFP HF devices 136 may connect to the BT HFP HF devices 135 similar to system 400 described above (that is, by replacing the BT HFP AG device 113 in FIG. 4 with the BT HFP HF device 136 in FIG. 5, and replacing the BT HFP HF device 136 in FIG. 4 with the BT HFP HF device 135 in FIG. 5). The function of the SCO and SLC streams are similar to those described above with reference to FIG. 4. If only audio data routing is needed, the SLC connections indicated by dash lines in FIG. 5 are optional, and the SCO connections are required for bidirectional audio transfer. If phone call function is needed, the SLC connections are necessary.

According to one aspect, a data relay device may comprise a first chip and a second chip. The first chip may be configured to wirelessly connect to one or more physical sink devices. The second chip may be configured to: create one or more virtual sink devices configured to be wirelessly detectable by one or more physical source devices, in response to the one or more physical source devices wirelessly connecting to the second chip, obtain data from the one or more physical source devices, and transmit the data to the first chip, causing the first chip to relay the data to the one or more physical sink devices.

Figure 6:
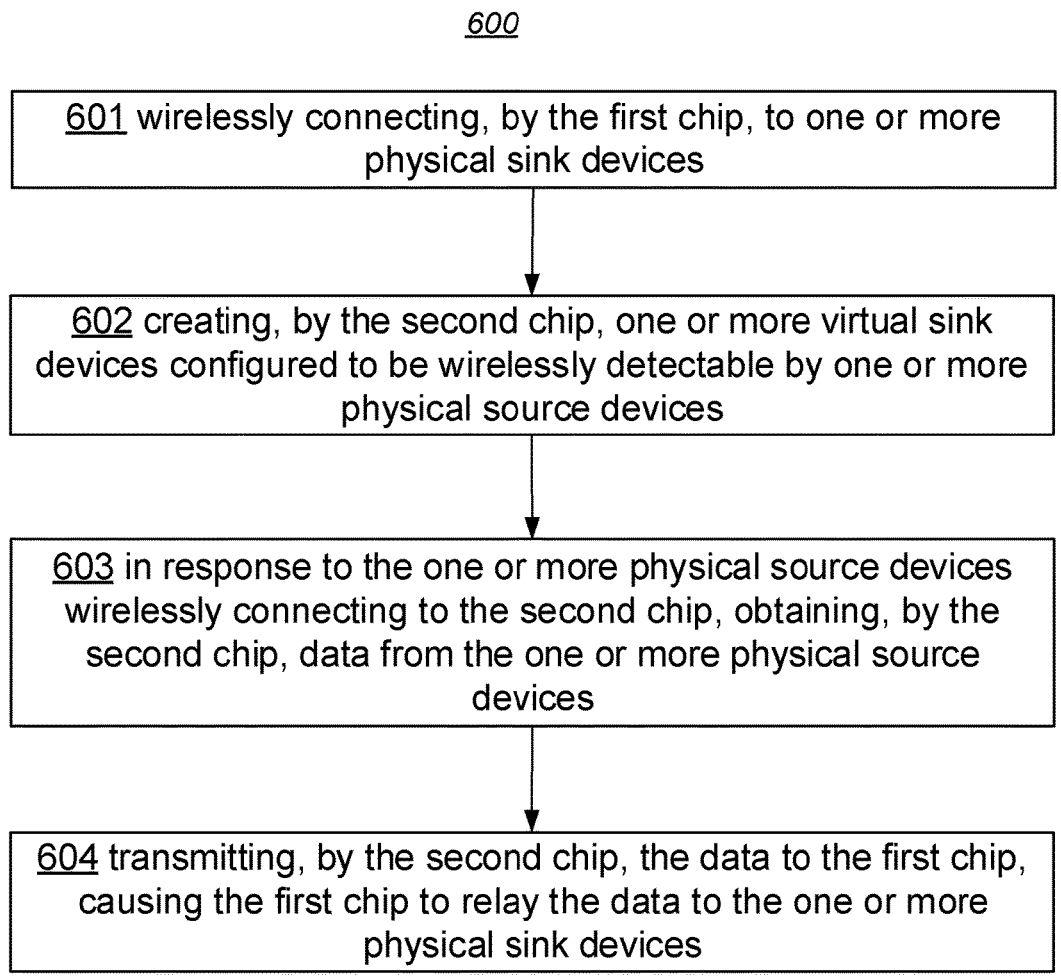
FIG. 6 is a flow diagram illustrating a hub-based data relay method, consistent with exemplary embodiments of the present disclosure.

FIG. 6 is a flow diagram illustrating a hub-based data relay method 600, consistent with exemplary embodiments of the present disclosure. The method 600 may be implemented in various environments including, for example, the environments described above with reference to FIG. 1A to FIG. 5. The example method 600 may be implemented by one or more components of the Hub 120 (e.g., the processor 15 and/or the memory 18). For example, the processor 15 may comprise a first chip (e.g., the BT chip 17) and a second chip (e.g., the BT chip 16), which are configured to perform the method 600. The processor 15 may optionally comprise the CPU 19. For another example, the processor 15 and the memory 18 (a non-transitory computer-readable storage medium) may couple to each other. The processor may comprise a first chip and a second chip. The memory 18 may store instructions that, when executed by the processor 15, cause the processor 15 to perform the method 600. The operations of method 400 presented below are intended to be illustrative. Depending on the implementation, the example method 400 may include additional, fewer, or alternative steps performed in various orders or in parallel.

In some embodiments, block 601 may comprise wirelessly connecting, by the first chip, to one or more physical sink devices. Block 602 may comprise creating, by the second chip, one or more virtual sink devices configured to be wirelessly detectable by one or more physical source devices. Block 603 may comprise, in response to the one or more physical source devices wirelessly connecting to the second chip, obtaining, by the second chip, data from the one or more physical source devices. Block 604 may comprise transmitting, by the second chip, the data to the first chip, causing the first chip to relay the data to the one or more physical sink devices.

In some embodiments, the physical source device comprises an audio data providing device (e.g., audio source devices such as a microphone capturing audio data, a computer providing audio data, or a mobile phone providing audio data. The physical sink device comprises an audio playing device (e.g., speaker, earphone). In some embodiments, the physical source device comprises audio gateway devices (e.g., computer, phone) and the physical sink device comprises hand-free devices (e.g., headphone, wearable device). In some embodiments, the physical source device and the physical sink device each comprise hand-free devices (e.g., headphone, wearable device).

In some embodiments, the data transmitted among the one or more physical sources devices, the data relay device, and the one or more physical sink devices comprises audio data. The wireless connection between the first chip and the one or more physical sink devices comprises one or more Bluetooth connections, and the wireless connection between the second chip and the one or more physical sources devices comprises one or more Bluetooth connections.

In some embodiments, the data relay device further comprises a memory storing one or more profiles. Wirelessly connecting to the one or more physical sink devices comprises registering the one or more physical sink devices in the profile, and the created the one or more virtual sink devices correspond to the registered one or more physical sink devices.

In some embodiments, the one or more physical sink devices comprise multiple physical sink devices. Wirelessly connecting to one or more physical sink devices comprises registering a stream endpoint for each of the multiple physical sink devices in the profile. Creating the one or more virtual sink devices configured to be wirelessly detectable by the one or more physical source devices comprises creating one or more virtual sink endpoints each connectable to one of the physical source devices. Transmitting the data to the first chip comprises: determining a pairing between each of the physical source devices and one or more of the physical sink devices, and transmitting the data based on the determined pairing.

In one example, the physical source devices comprise a first physical source device paired with a plurality of first physical sink devices of the physical sink devices. Obtaining the data from the first physical source device comprises streaming first data from the first physical source device to a first of the virtual sink end points via a Bluetooth connection. Relaying the data to the first physical sink devices comprises streaming the first data to the first physical sink devices each via a Bluetooth connection. In some embodiments, the physical source devices further comprises a second physical source device paired with one or more second physical sink devices of the physical sink devices. Obtaining data from the second physical source device comprises streaming second data from the second physical source device to a second of the virtual sink end points via an Bluetooth connection. Relaying the data to the second physical sink devices comprises stream the second data to the second physical sink devices each via an Bluetooth connection. The first and second data is played simultaneously and respectively at the first and second physical sink devices.

In some embodiments, the profile is an Advanced Audio Distribution Profile (A2DP). The Bluetooth connection between the first chip and the one or more physical sink devices and the Bluetooth connection between the second chip and the one or more physical source devices each comprise an Advanced Audio Distribution Profile (A2DP) connection.

In some embodiments, the profile is a Hands-Free Profile (HFP) for bi-directional data transfer. The Bluetooth connection between the first chip and the one or more physical sink devices and the Bluetooth connection between the second chip and the one or more physical source devices each comprise a Synchronous (SCO) Stream connection. In some embodiments, the Bluetooth connection between the first chip and the one or more physical sink devices and the Bluetooth connection between the second chip and the one or more physical source devices each further comprise a Service Level connection (SLC), and the first chip and the second chip are connected directly by a SLC.

A person skilled in the art can further understand that, various exemplary logic blocks, modules, circuits, and algorithm steps described with reference to the disclosure herein may be implemented as specialized electronic hardware, computer software, or a combination of electronic hardware and computer software. For examples, the modules/units may be implemented by one or more processors to cause the one or more processors to become one or more special purpose processors to executing software instructions stored in the computer-readable storage medium to perform the specialized functions of the modules/units.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware for allowing specialized components to perform the functions described above. Furthermore, embodiments of the present disclosure may take the form of a computer program product embodied in one or more tangible and/or non-transitory computer-readable storage media containing computer-readable program codes. Common forms of non-transitory computer readable storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a computer, an embedded processor, or other programmable data processing devices to produce a special purpose machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions (which are executed on the computer or other programmable devices) provide steps for implementing the functions specified in one or more flows in the flow diagrams and/or one or more blocks in the block diagrams. In a typical configuration, a computer device includes one or more Central Processors (CPUs), an input/output interface, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, and removable and non-removable media, wherein information storage can be implemented with any method or technology. Information may be modules of computer-readable instructions, data structures and programs, or other data. Examples of a non-transitory computer-readable medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, a cache, a register, or any other non-transmission media that may be used to store information capable of being accessed by a computer device. The computer-readable storage medium is non-transitory, and does not include transitory media, such as modulated data signals and carrier waves.

The specification has described attention monitoring methods, apparatus, and systems for hub-based Bluetooth audio relay. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A data relay device, comprising:
a first chip configured to wirelessly connect to multiple physical sink devices;
a second chip configured to:
create one or more virtual sink devices configured to be wirelessly detectable by one or more physical source devices, in response to the one or more physical source devices wirelessly connecting to the second chip, obtain data from the one or more physical source devices, the wireless connection between the first chip and the multiple physical sink devices comprises one or more Bluetooth connections, to wirelessly connect to the multiple physical sink devices, the first chip is configured to register the multiple physical sink devices in the profile, the wireless connection between the second chip and the one or more physical source devices comprises one or more Bluetooth connections, the created the one or more virtual sink devices correspond to the registered multiple physical sink devices, the physical source devices comprise a first physical source device paired with a plurality of first physical sink devices of the physical sink devices and a second physical source device paired with one or more second physical sink devices of the physical sink devices; and
transmit the data to the first chip, causing the first chip to relay the data to the first physical sink devices, the first chip is configured to stream the first data to the first physical sink devices each via a Bluetooth connection, to relay the data to the second physical sink devices, the first chip is configured to stream the second data to the second physical sink devices each via the Bluetooth connection; and
the first and second data is played simultaneously and respectively at the first and second physical sink devices.

2. The data relay device of claim 1, wherein:
the physical source device comprises an audio data providing device;

the physical sink device comprises an audio playing device; and
the data transmitted among the one or more physical sources devices, the data relay device, and the multiple physical sink devices comprises audio data.

3. The data relay device of claim 1, wherein:
to wirelessly connect to multiple physical sink devices, the first chip is configured to register a stream endpoint for each of the multiple physical sink devices in the profile;
to create the one or more virtual sink devices configured to be wirelessly detectable by the one or more physical source devices, the second chip is configured to create one or more virtual sink endpoints each connectable to one of the physical source devices; and
to transmit the data to the first chip, the second chip is configured to:
determine a pairing between each of the physical source devices and multiple of the physical sink devices, and
transmit the data based on the determined pairing.

4. The data relay device of claim 3, wherein:
to obtain the data from the first physical source device, the second chip is configured to stream first data from the first physical source device to a first of the virtual sink end points via a Bluetooth connection.

5. The data relay device of claim 4, wherein:
to obtain the data from the second physical source device, the second chip is configured to stream second data from the second physical source device to a second of the virtual sink end points via the Bluetooth connection.

6. The data relay device of claim 5, wherein:
the profile is an Advanced Audio Distribution Profile (A2DP); and
the Bluetooth connection between the first chip and the multiple physical sink devices and the Bluetooth connection between the second chip and the one or more physical source devices each comprise an Advanced Audio Distribution Profile (A2DP) connection.

7. The data relay device of claim 5, wherein:
the profile is a Hands-Free Profile (HFP) for bi-directional data transfer; and
the Bluetooth connection between the first chip and the multiple physical sink devices and the Bluetooth connection between the second chip and the one or more physical source devices each comprise a Synchronous (SCO) Stream connection.

8. The data relay device of claim 7, wherein:
the Bluetooth connection between the first chip and the multiple physical sink devices and the Bluetooth connection between the second chip and the one or more physical source devices each further comprise a Service Level connection (SLC); and
the first chip and the second chip are connected directly by a SLC.

9. A data relay method, implementable by a data relay device comprising a first chip; and
a second chip, comprising:
wirelessly connecting, by the first chip, to multiple physical sink devices;
creating, by the second chip, one or more virtual sink devices configured to be wirelessly detectable by one or more physical source devices;
in response to the one or more physical source devices wirelessly connecting to the second chip, obtaining, by the second chip, data from the one or more physical source devices the wireless connection between the first chip and the multiple physical sink devices comprises one or more Bluetooth connections, to wirelessly connect the multiple physical sink devices, the first chip is configured to register the multiple physical sink devices in the profile, the wireless connection between the second chip and the one or more physical source devices comprises one or more Bluetooth connections, the create the one or more virtual sink devices correspond to the registered multiple physical sink devices, the physical source devices comprise a first physical source device paired with a plurality of first physical sink devices of the physical sink devices and a second physical source device paired with one or more second physical sink devices of the physical sink devices;

transmitting, by the second chip, the data to the first chip, causing the first chip to relay the data to the first physical sink devices, the first chip is configured to stream the first data to the first physical sink devices each via a Bluetooth connection, to relay the data to the second physical sink devices, the first chip is configured to stream the second data to the second physical sink devices each via the Bluetooth connection; and playing, by the first and second physical sink device respectively, the first and second data simultaneously.

10. The data relay method of claim 9, wherein:
the physical source device comprises an audio data providing device;
the physical sink device comprises an audio playing device; and
the data transmitted among the one or more physical sources devices, the data relay device, and the multiple physical sink devices comprises audio data.

11. The data relay method of claim 9, wherein:
wirelessly connecting to multiple physical sink devices comprises registering a stream endpoint for each of the multiple physical sink devices in the profile;
creating the one or more virtual sink devices configured to be wirelessly detectable by the one or more physical source devices comprises creating one or more virtual sink endpoints each connectable to one of the physical source devices; and
transmitting the data to the first chip comprises:
 determining a pairing between each of the physical source devices and multiple of the physical sink devices, and
 transmitting the data based on the determined pairing.

12. The data relay method of claim 11, wherein:
obtaining the data from the first physical source device comprises streaming first data from the first physical source device to a first of the virtual sink end points via a Bluetooth connection.

13. The data relay method of claim 12, wherein:
obtaining the data from the second physical source device comprises streaming second data from the second physical source device to a second of the virtual sink end points via the Bluetooth connection.

14. The data relay method of claim 13, wherein:
the profile is an Advanced Audio Distribution Profile (A2DP); and
the Bluetooth connection between the first chip and the multiple physical sink devices and the Bluetooth connection between the second chip and the one or more physical source devices each comprise an Advanced Audio Distribution Profile (A2DP) connection.

15. The data relay method of claim 13, wherein:
the profile is a Hands-Free Profile (HFP) for bi-directional data transfer; and
the Bluetooth connection between the first chip and the multiple physical sink devices and the Bluetooth connection between the second chip and the one or more physical source devices each comprise a Synchronous (SCO) Stream connection.

16. The data relay method of claim 15, wherein:
the Bluetooth connection between the first chip and the multiple physical sink devices and the Bluetooth connection between the second chip and the one or more physical source devices each further comprise a Service Level connection (SLC); and
the first chip and the second chip are connected directly by a SLC.

* * * * *

UNITED STATES PATENT AND TRADEMARK OFFICE
CERTIFICATE OF CORRECTION

PATENT NO. : 10,368,376 B2
APPLICATION NO. : 15/787796
DATED : July 30, 2019
INVENTOR(S) : Daguang Gu, Haitao Shi and Fuyong Zhao Page 1 of 1

It is certified that error appears in the above-identified patent and that said Letters Patent is hereby corrected as shown below:

On the Title Page

Assignee, item (73):
"Cassia Network Inc." should read -- Cassia Networks Inc. --.

In the Claims

Claim 9, Column 17, Line 1:
"devices the wireless" should read -- devices, the wireless --.

Signed and Sealed this
Eighth Day of October, 2019

Andrei Iancu
*Director of the United States Patent and Trademark Office*